(12) United States Patent
Genoud et al.

(10) Patent No.: US 7,395,689 B2
(45) Date of Patent: Jul. 8, 2008

(54) CALIBRATION WEIGHT ARRANGEMENT FOR AN ELECTRONIC BALANCE

(75) Inventors: Dominique Genoud, Uster (CH); Christoph Latzer, Pfaffikon (CH)

(73) Assignee: Mettler-Toledo AG, Greifensee (CH)

( * ) Notice: Subject to any disclaimer, the term of this patent is extended or adjusted under 35 U.S.C. 154(b) by 282 days.

(21) Appl. No.: 11/164,795

(22) Filed: Dec. 6, 2005

(65) Prior Publication Data

US 2006/0196700 A1 Sep. 7, 2006

(30) Foreign Application Priority Data

Dec. 23, 2004 (EP) .................. 04106970

(51) Int. Cl.
*G01L 25/00* (2006.01)
(52) U.S. Cl. ....................................... 73/1.13
(58) Field of Classification Search ........................ None
See application file for complete search history.

(56) References Cited

U.S. PATENT DOCUMENTS

| 5,148,881 A | 9/1992 | Leisinger ...................... 177/50 |
| 5,866,854 A | 2/1999 | Emery ........................... 177/50 |
| 6,194,672 B1 | 2/2001 | Burkhard et al. ....... 177/210 EM |
| 6,574,958 B1 | 6/2003 | MacGregor ................... 60/527 |
| 6,851,260 B2 | 2/2005 | Mernoe ........................ 60/527 |

FOREIGN PATENT DOCUMENTS

| DE | 195 09 177 A1 | 9/1996 |
| DE | 203 18 788 | * 5/2004 |
| JP | 59-090031 | 5/1984 |

* cited by examiner

*Primary Examiner*—Robert R Raevis
(74) *Attorney, Agent, or Firm*—Standley Law Group LLP (57) ABSTRACT

An electronic balance with a force-transmitting device (1, 101) has a calibration weight arrangement (4, 104). The arrangement includes a calibration weight (3, 103) capable of being coupled to the force-transmitting device (1, 101). It also includes a transfer mechanism and a drive source to effect a guided movement of the calibration weight (3, 103). The drive source has an actuator (16) that cooperates with the transfer mechanism and consists, at least in part, of a shape memory alloy. The actuator (16) moves the calibration weight (3, 103) through a structural change of the shape memory alloy as a result of a temperature change.

23 Claims, 6 Drawing Sheets

CALIBRATION WEIGHT ARRANGEMENT FOR AN ELECTRONIC BALANCE

TECHNICAL FIELD

Figure 2:
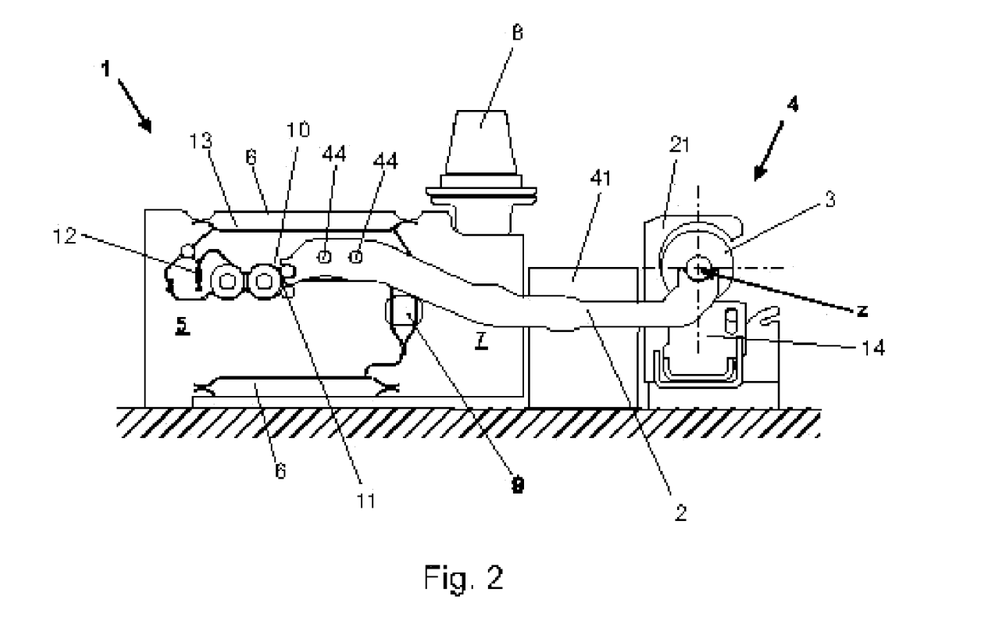
FIG. 2 represents a schematic, simplified side view of the force-transmitting device and calibration weight arrangement of FIG. 1 while the calibration is taking place.

To perform a calibration, the calibration weight is lowered transfer mechanism onto the two calibration weight receivers 2, whereby the calibration weight is put into force-transmitting contact with the lever mechanism, as shown in FIG. 2. In the illustrated condition, the calibration weight 3 rests completely on the calibration weight receiver 2 and is no longer in contact with the calibration weight holder 14. The transfer mechanism is hidden from view here by the calibration weight holder 14. The calibration weight arrangement comprises a lifting element and a drive source. In many cases, an eccentric is used as a lifting element, powered by a commercially available servomotor (not shown in the drawing). In general, the drive source is arranged laterally of the calibration weight arrangement, which in relation to the drawings is either in front of the drawing plane or behind it.

BACKGROUND OF THE ART

Electronic balances in many cases are calibrated by means of an internal calibration weight. To perform a calibration, a calibration weight of a specifically defined mass is brought into force-transmitting contact with the force-transmitting device that is arranged in a force-measuring cell of a balance, whereupon a reference value is determined. Based on this reference value, further weighing parameters of the balance can be adjusted. After the calibration has been performed, the contact between the calibration weight and the force-transmitting device is released again, and the calibration weight is secured in a rest position. In the foregoing process, the calibration weight is moved from a rest position into a calibrating position and back to the rest position by a transfer mechanism which includes at least one lifting element and a drive source. In the calibrating position, the calibration weight is in force-transmitting contact with the force-transmitting device; in the rest position there is no force-transmitting contact.

The known state of the art includes different kinds of lifting elements and realizations of calibration weight arrangements.

A calibration weight, as disclosed in commonly-owned U.S. Pat. No. 5,148,881 to Leisinger, is moved vertically by wedges arranged in pairs that slide horizontally against each other, whereby the calibration weight is brought into force-transmitting contact with the force-transmitting device of the balance. This lifting element is driven by a motor through a spindle that is connected to the wedges.

A likewise vertical lifting and lowering of a calibration weight is achieved by a device that is described in commonly-owned U.S. Pat. No. 6,194,672 B1 to Burkhard. The weight rests on a holder which is moved by an electrically driven lifting element.

German Gebrauchmuster 203 18 788 U1 describes a monolithic calibration weight that is raised and lowered by a ramp-like lifting element which is driven by a linear drive and performs a kind of inclined parallel movement.

In many balances, the calibration weight arrangement and the force-transmitting device are arranged behind one another in the manner disclosed in the Burkhard '672 patent. However, the calibration weight can also be split up, for example into two calibration weights that are attached laterally to the force-transmitting device like the calibration weights disclosed in commonly-owned U.S. Pat. No. 5,866,854 to Emery, which have the shapes of circular cylinders. The two identical weights are arranged on two opposite sides of the force-transmitting device. Two different mechanisms for moving the calibration weights are described. In the first case, the calibration weight which comprises a guide pin rests on a calibration weight holder that is configured as a support cradle. To perform a calibration, the calibration weight holder which is pivoted on one side is tilted downwards, whereby the calibration weight is lowered onto two calibration weight receivers below the calibration weight holder, which have the shape of rods or levers and are connected to the force-transmitting device. In a second variant, the weight in its rest position lies on a calibration weight holder that is arranged between the calibration weight receivers that are connected to the force-transmitting device. To perform a calibration, a vertical downward movement of the calibration weight holder brings the calibration weight into contact with the calibration weight receivers.

In general, the aforementioned lifting elements are driven by small servomotors. It is a disadvantage in using servomotors that they use a relatively large amount of space in the force-measuring cell of the balance, whereby the size of the force-measuring cell itself as well as of the balance is increased unnecessarily.

Especially in electronic balances of high sensitivity, the weighing result is influenced or even changed by electrostatic charges and interactions. The servomotors used to drive the transfer mechanisms contain electrically non-conductive gearbox parts which in the course of their operation produce electrostatic fields through friction. The resultant electrostatic fields, and also electromagnetic fields, are strong enough to influence the weighing result, particularly in balances of high sensitivity.

An alternative drive source associated with a balance is shown in JP 59090031 A, which discloses the use of a shape memory alloy (SMA) used in connection with a balance for the determination of the volume and the specific gravity of a sample. The shape memory alloy has the shape of a spiral-wound wire connected to hooks at both ends. The upper hook is connected to a balance, and the sample is suspended on the lower hook. The weight of the sample is first measured in air. In the following step, the SMA wire is exposed to infrared radiation and thereby indirectly heated. The heating causes an axial contraction of the SMA material which has the effect that the sample, which remains fastened to the hook during the entire procedure, is lowered into a water bath that has been set in place, whereupon the weight of the sample under water is determined.

The shape memory alloy is used in this case in the shape of a spiral spring that can vary its length and is arranged as an extension or as a substitute for the weighing pan. This spring is freely suspended from the balance that is arranged above the spring and the water bath. The movement of the spring is not guided by constraints, which means that the sample is free to rotate, tilt or swing. The critical issue in measurements of this kind is that the sample can be completely submerged in the liquid; the speed is irrelevant in this process as long as no liquid escapes from the container.

Almost always, the calibration weight arrangements of the known prior art comprise relatively large drive sources. An improvement of the calibration weight arrangement therefore requires in particular an optimization and miniaturization of the drive source of the transfer mechanism. The drive source needs to be very small, compact, and flexible in the ways it can be used.

SUMMARY OF THE INVENTION

This task is solved through a calibration weight arrangement with the features according to the appended claims. The calibration weight arrangement for an electronic balance with a force-transmitting device comprises at least one calibration weight arranged to be coupled to the force-transmitting device of the balance and it also has a transfer mechanism and a drive source to effect a guided movement of the calibration weight. The drive source cooperates with the transfer mechanism and comprises an actuator consisting at least in part of a shape memory alloy which moves the calibration weight by means of a change in the inner structure, specifically the crystal structure, of the shape memory alloy.

Shape memory alloys have two very characteristic properties. They are pseudo-elastic and exhibit a shape memory effect. These properties are related to a solid state phase transition, i.e., a rearrangement of molecules that is peculiar to shape memory alloys. In most shape memory alloys, when they are in the temperature range of the phase transition, a temperature change of about 10° C. is enough to initiate the phase change. At temperatures below the phase transition temperature, the shape memory alloy is in its martensitic phase. This phase is distinguished by the fact that the material is relatively soft and formable. At temperatures above the phase transition temperature, the shape memory alloy is in its austenitic phase in which the material is more rigid.

Shape memory alloys have different physical properties dependent on the temperature and/or the mechanical forces that they are subjected to.

The shape memory effect is observed when the temperature of an object of a shape memory alloy is decreased below the phase transition temperature of the alloy. The object, being in the pliable martensitic phase, can easily be deformed. When the temperature is subsequently raised again above the phase transition temperature, the material is transformed back to its austenitic phase and with the transformation also resumes its original shape.

Shape memory alloys further exhibit a so-called pseudo-elasticity. This effect occurs when the alloy is completely in the austenitic phase, i.e., at a temperature above the phase transition temperature. Pseudo-elasticity is an isothermal effect which occurs without a temperature change. For example, if an object made of a shape memory alloy is subjected to a sufficiently large force, it will transform itself from its austenitic phase into the martensitic phase. As the force is received by the formable martensite, the object responds by undergoing a deformation. However, when the force subsides again, the object returns to its original shape in the austenitic phase.

The phase transition which is triggered by a temperature increase releases an energy which can be utilized, e.g., as a drive source. A temperature change can easily be produced with a heating device that is in contact with the shape memory alloy, for example an IR radiator, a heating wire coil, a hot air stream or a current source. With preference, a current source is used as a heating device. In addition to the fact that it can be designed very small and compact and that it can be controlled simply and precisely through the electronics of the balance, a current source has most of all the advantage that it produces no additional heat which could influence the weighing result.

The phase transition takes place above a certain temperature range which varies dependent on the shape memory alloy being used. The transition temperature range makes it possible to stop the shape change or the contraction by holding the temperature at a specific value, or also in part to determine the speed of the shape change through the heating rate.

For example, a wire made of this kind of material will contract in length by a certain percentage, depending on the shape memory alloy being used, when heated above its phase transition temperature. As a result, the wire can exert a tensile force on an object that is attached to the wire. This effect is used to apply a pulling force to the transfer mechanism and thereby cause it to change its position.

The design of the actuator determines the magnitude and the nature of the force being exerted. For example, a wire made of a shape memory alloy contracts itself when its temperature is raised beyond the phase transition temperature. Simply as a result of a temperature change, a wire of a shape memory alloy can therefore exert a pulling force on an object attached to it. Using the shape memory alloy in wire form is therefore the preferred choice, because the wire can be heated simply and rapidly and also cools down again quickly in air without additional cooling measures. The shape memory alloy is heated only during the calibration process. As a consequence of this factor, together with the design of the actuator as a wire, there is hardly any electrostatic influence that could affect the force-measuring cell and thus have a detrimental effect on the weighing result.

The actuator which consists at least in part of a shape memory alloy represents not only a part of the drive source but can also be used as a sensor for checking a position. If the shape memory alloy has the form of a wire, the latter will have different electrical resistance values in the martensitic and austenitic phase, respectively. By measuring the resistance of the wire, one can therefore determine the current phase condition of the shape memory alloy and thus whether the wire is contracted, i.e., whether a pulling force is acting on the transfer mechanism. This represents a further advantage in regard to the compactness of the calibration weight arrangement, as it avoids the need to add a sensor for a function check of the transfer mechanism.

The pulling force of the actuator that has the form of a wire is connected to the length contraction of the wire that occurs as a result of a phase change caused by an increase in temperature. In order to achieve a pulling force that is optimally matched to the given calibration weight arrangement and the calibration weight, the length of the wire needs to be appropriately selected for the displacement travel to be effected by the pulling action, as the length of the wire changes only by a specific percentage, depending on the kind of shape memory alloy being used. With the length of the wire being thus predetermined, it may in some cases be advantageous to direct the wire in a folded path in order to maximize the force being transmitted. With preference, the pulling force of the wire which is released by a phase transition is therefore redirected around at least one cylindrical roller and/or through a lever. Furthermore, the directional changes with levers and/or rollers allow a very space-saving and flexible arrangement of the wire in the force-measuring cell of the balance.

The direction-changing rollers consist preferably of a smooth, electrically and thermally non-conductive material which allows the wire to glide relative to the direction-changing roller without causing abrasive wear on the wire itself or on the rollers, or even causing the wire to cut into the rollers. Materials that are therefore particularly well suited are technical polymers, especially a fluoropolymer such as that sold commercially under the trademark TEFLON.

The transfer mechanism of the calibration weight arrangement comprises a resetting element and a lifting element. It is also possible for a single element, for example a spring, to perform the combined functions of resetting element and lifting element. The lifting element effects a guided displacement of the calibration weight holder with the calibration weight, whereby the latter can be brought into force-transmitting contact with the force-transmitting device of a balance when a calibration is carried out. After the calibration has been completed, the force-transmitting contact has to be released again, and the transfer mechanism needs to be returned to its rest position. This task is performed by the resetting element, which provides a sufficiently large force to bring the transfer mechanism back to its rest position.

The resetting element further has the function, as the wire-shaped actuator is cooling down, to extend it back to its original length. As soon as the supply of heat is interrupted, the wire begins to cool down. When the shape memory alloy from which the wire is made passes below its phase transition temperature, it becomes more formable and the wire therefore returns again to its original shape and length. This process is supported and enhanced by the resetting element.

The transfer mechanism can include different kinds of lifting elements. With preference, the lifting elements are configured as wedges that slide against each other in pairs, as compressive coil springs, or as at least one knee-joint linkage. In the case of coil springs, the latter can simultaneously function as the resetting element.

To perform a calibration, the calibration weight is brought into force-transmitting contact with at least one calibration weight receiver that is coupled to the force-transmitting device.

The shape memory alloy that makes up at least parts of the actuator has a phase transition temperature of more than 70° C., preferably more than 80° C. Accordingly, a balance with a drive source consisting at least partially of a shape memory alloy can be stored at temperatures from −10 to +70° C. that are normal for balances.

Shape memory alloys include among others a group consisting of $NiTi_2$, CuZn, CuZnAl, CuZnGa, CuZnSn, CuZnSi, CuAlNi, CuAuZn, CuSn, AuCd, AgCd, NiAl and FePt. The preferred choice is a nickel-titanium alloy with a nickel content of at least 40%, preferably about 50%. This alloy has a phase transition temperature of at least 90° C. A wire of this alloy with a diameter of about 150 μm will contract in length by about 4% when rising above the phase transition temperature.

The layout of a calibration weight arrangement in relation to the force-transmitting device of an electronic balance as well as several embodiments of the calibration weight arrangement are shown in the drawing figures which will be described hereinafter. The actuator which is made of a shape memory alloy, preferably in the form of a wire, will be referred to as SMA wire.

DETAILED DESCRIPTION OF A PREFERRED EMBODIMENT

Figure 1:
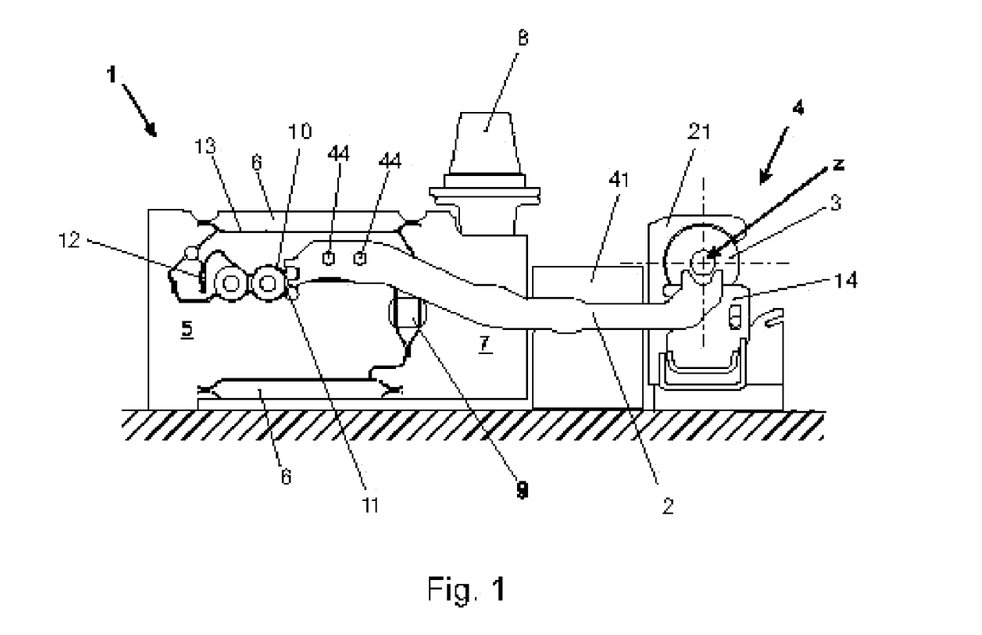
FIG. 1 represents a schematic, simplified side view of a force-transmitting device of an electronic balance with extended calibration weight receivers and, located next to the force-transmitting device, a calibration weight arrangement in its rest position, with a calibration weight having a calibration weight axis.

Both of the FIGS. 1 and 2 represent side views of a calibration weight arrangement 4 as described in the prior art, showing its position in relation to a force-transmitting device 1 of a force-measuring cell, for example in an electronic balance. The calibration weight arrangement 4 in FIG. 1 is at its rest position, while FIG. 2 shows the situation at the time of a calibration. The force-transmitting device 1 comprises a parallel-guiding mechanism with a stationary parallelogram leg 5 and a movable parallelogram leg 7, wherein the latter is constrained to the former by two parallelogram guides 6. A weighing pan (not shown in the drawing) connects through a cone 8 to the movable parallelogram leg 7 which in response to a load on the weighing pan is movable relative to the stationary parallelogram leg 5, following the direction of gravity. The force-transmitting device 1 comprises a first coupling element 9 which, when a force is introduced into the movable parallelogram leg 7, transmits the force to a lever mechanism. In the force-transmitting device 1 as illustrated, the lever mechanism has a first force-reduction lever 10 which is connected through a second coupling element 12 to a second lever 11. The first and second coupling elements 9, 12 act, respectively, on the first and second levers 10, 11 through flexure joints in the form of thin connections.

A displacement of the movable parallelogram leg 7 in the direction of gravity causes a force to be transmitted to the lever mechanism. The latter reduces the force and transmits it further to a force compensation system 41 which is often based on an electromagnetic principle and is not shown in detail in the drawing.

The parallel-guiding mechanism 5, 6, 7, the first and second coupling elements 9, 12, and the first and second levers 10, 11 are formed in the substantially brick-shaped material block in such a manner that the different material portions of the block are separated from each other by material-free spaces in the form of narrow linear cuts 13 that cut through the material block perpendicular to the plane of its largest surface. The narrow linear cuts 13 are produced preferably by spark erosion.

The lever 10 has holes where two calibration weight receivers are attached by means of suitable fasteners 44, so that the calibration weight receivers 2 act as an extension of the shorter lever arm on the force-input side of the first lever 10. The second of the calibration weight receivers 2 is arranged parallel to the first on the opposite side of the force-transmitting device, hidden from view in this drawing.

As can be seen in FIG. 1, during a weighing process the calibration weight 3 rests on a calibration weight holder 14 and is pushed against the lateral parts 21 of the calibration weight arrangement which are configured as parking brackets. The calibration weight 3 comprises a calibration weight axis (z). For the sake of clarity, the lateral part that would face the viewer has been omitted from this drawing as well as from FIG. 2. In its rest position, the calibration weight 3 is completely uncoupled from the lever mechanism of the force-transmitting device.

To perform a calibration, the calibration weight is lowered by means of a transfer mechanism onto the two calibration weight receivers 2, whereby the calibration weight is put into force-transmitting contact with the lever mechanism, as shown in FIG. 2. In the illustrated condition, the calibration weight 3 rests completely on the calibration weight receiver 2 and is no longer in contact with the calibration weight holder 14. The transfer mechanism is hidden from view here by the calibration weight holder 14. The transfer mechanism comprises a lifting element and a drive source. In many cases, an eccentric is used as a lifting element, powered by a commercially available servomotor (not shown in the drawing). In general, the drive source is arranged laterally of the calibration weight arrangement, which in relation to the drawings is either in front of the drawing plane or behind it.

Figure 3:
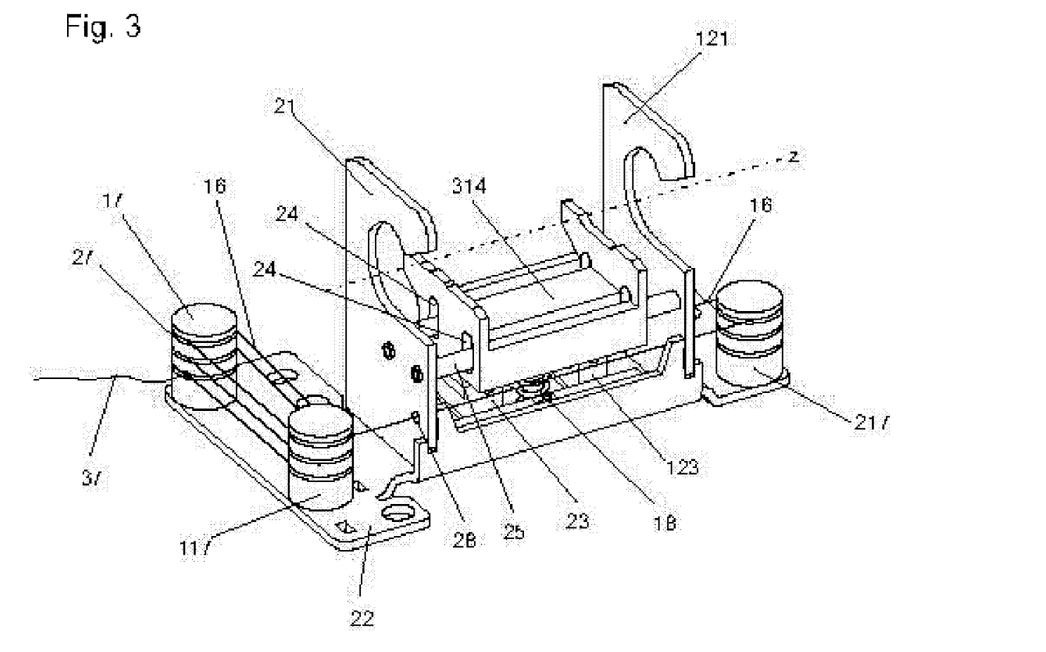
FIG. 3 represents a perspective view of a calibration weight arrangement with an actuator made of a shape memory alloy in the form of a wire directed along a folded path by way of three rollers.

FIG. 3 gives a perspective view of a calibration weight arrangement in which an SMA wire 16 forms part of the actuator. The calibration weight arrangement is mounted on a base plate 22 and is substantially comprised of two lateral parts 21, 121 configured as parking brackets, a transfer mechanism consisting of a lifting element 23, 123 and a resetting element 18 configured as a compressive coil spring, a calibration weight holder 314, three direction-changing rollers 17, 117, 217, and an SMA wire 16 functioning as an actuator, with an electrical connection 37 for an electrical heating device being symbolically indicated. The two lateral parts 21, 121 of the calibration weight arrangement, which are configured as parking brackets, serve to immobilize the calibration weight (see FIGS. 1 and 2)—whose orientation is indicated here by the calibration weight axis (z)—in its rest position. As seats for the calibration weight, the lateral parts 21, 121 have cutouts of approximately circular shape. The calibration weight in its rest position rests on the calibration weight holder 314 is pushed against the parking brackets 21, 121 by the force of the resetting spring 18, so that the calibration weight is protected from jumping out of place in case of a hard drop or shock.

The calibration weight holder 314 is rigidly connected to the lifting element 23, 123 and constrained to a vertical travel direction by two guide rods 25 that are fastened to the lateral parts 21, 121 and reach through two elongated holes 24 in the calibration weight holder. The elongated holes 24 simultaneously define the maximal vertical travel range of the calibration weight holder 314 and in addition serve as a safeguard to keep the calibration weight holder 314 from tipping.

The calibration weight holder 314 is moved vertically by the lifting elements 23, 123 and/or the resetting spring 18. The lifting elements 23, 123 are designed in the form of two knee-joint linkages, at least one of which is connected to the actuator that includes an SMA wire 16. The knee-joint linkages 23, 123 are shown more clearly in FIG. 5. In principle, each knee-joint linkage is comprised of two shaped parts with an articulated connection. A horizontal force acting on the joint will cause the knee to buckle, in the illustrated example in the direction towards the lateral part 121. As a result, the calibration weight holder 314 which is fastened to the knee-joint-like lifting elements 23, 123 performs a vertical downward movement that is guided by the elongated holes 24 and the guide rods 25.

In the embodiment presented here, the SMA wire 16 is fastened directly to a joint of the knee-joint linkage 123 which, in turn, is connected to the knee-joint linkage 23. The wire 16 which functions as actuator consists of a shape memory alloy which contracts in length when the temperature rises above the phase transition temperature of the shape memory alloy, because of the phase transition from a martensitic phase to an austenitic phase. A connection 37, only symbolically indicated in the drawing, for an electrical heating device such as for example a current source is connected to one end of the SMA wire 16 and serves to heat the latter. The second electrical lead which is required to close the circuit is connected to the other end of the wire but in this drawing is hidden from view by the calibration weight holder 314 and the lateral part 121. For the sake of simplicity, the subsequent drawings and examples show only the connection for an electrical heating device, for example a current source. In the case of a current source, the ground connection is arranged at an appropriate point of the SMA wire at the opposite end from the supply connection.

The shape memory alloy used in this example is a nickel-titanium alloy in the form of a wire of about 150 μm diameter, which contracts in length by about 4% when its temperature is increased in the phase-transition temperature range. In order to generate a sufficient force for the buckling of the knee-joint linkages 23, 123, a nickel-titanium wire 16 of about 100 mm length is used, so that the pull of the wire causes a displacement of about 4 mm.

To use the available space optimally and to transmit the pulling force, the wire 16 is trained in a folded path around at least one roller, in the present embodiment around three direction-changing rollers 17, 117, 217. Two rollers 17, 117 in the form of columns are located on one of the narrow sides of the calibration weight arrangement, and a further roller of equal shape 217 is located on the opposite narrow side. The roller columns, which are rotatably mounted, comprise at least one ring groove 27 through which the SMA wire 16 is trained parallel to the base plate 22. The rollers in this embodiment consist of Teflon, which is electrically and thermally non-conductive and, with suitable processing, has a very smooth surface so that the SMA wire is guided in a virtually abrasion-free manner. Teflon further leaves the SMA wire free to glide in its longitudinal direction. Each of the rollers (17, 117, 217) in FIG. 3 comprises three grooves 27 guiding the SMA wire 16 along at least part of the roller perimeters.

The SMA wire 16 is fastened to the roller 17, continuing from there to the roller 117 and returning to roller 17 to be redirected once more by both rollers 17 and 117 before the wire passes through two holes 28 (only one of which is visible) in the lateral parts 21, 121 of the calibration weight arrangement to the third roller 217 on the opposite side of the calibration weight arrangement. The roller 217 turns the direction of the wire 16 around so that it passes through a further hole (not visible here) to the lifting element 123, to which the other end of the wire 16 is fastened. As long as an electrical current is supplied to the wire 16, the latter is in a contracted state relative to its original length and exerts a force on the lifting elements 23,123 so that they produce a vertical downward movement of the calibration weight holder 314. In this case, the force generated by the contraction of the SMA wire 16 together with the weight forces of the calibration weight holder 314 and the calibration weight need to counteract the spring force of the resetting spring 18. In the process, the calibration weight is lowered onto two calibration weight receivers (see FIG. 1 or 2) which are arranged, respectively, in the spaces between the calibration weight holder 314 and the lateral parts 21, 121. To return the calibration weight holder 314 to its rest position, the heat flow to the wire 16 is interrupted. The wire 16 cools down, passes into its more easily formable martensitic phase and increases its length again. As a result, the force acting on the lifting elements 23, 123 decreases, and due to the spring force of the resetting spring 18, the calibration weight holder 314 is pushed upward into its rest position. In this condition, the resetting spring counteracts the remaining tensile force of the SMA wire 16 while the latter is cooling down, and it also counteracts the weight forces of the calibration weight holder 314 and the calibration weight. At the same time, by straightening the knee-joint linkages 23, 123, the force of the resetting spring 18 acts on the SMA wire 16 as it is cooling down, so that the wire is stretched back to its original length.

Figure 4:
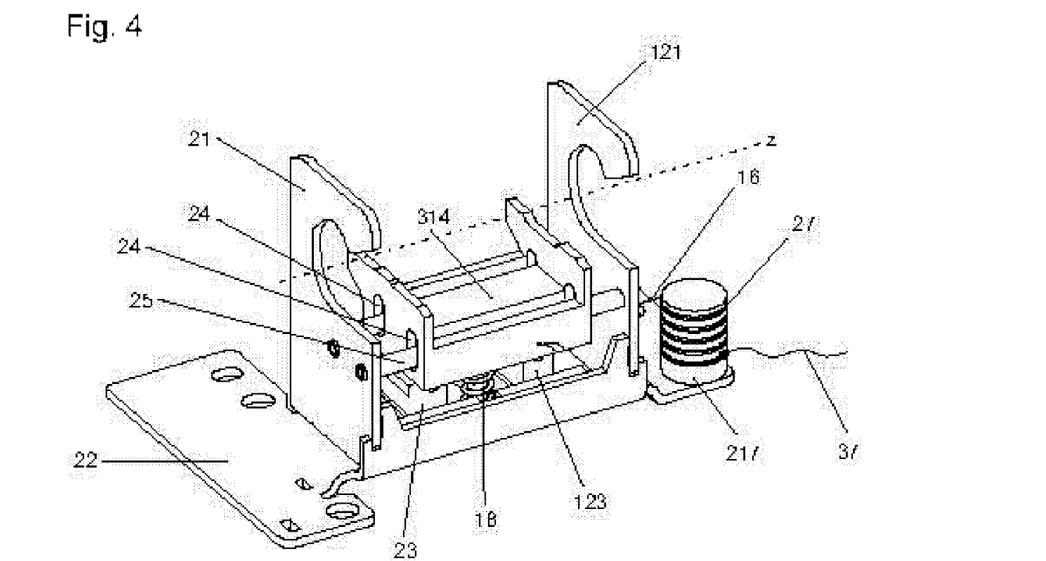
FIG. 4 represents a perspective view of a calibration weight arrangement with an actuator made of a shape memory alloy in the form of a wire directed along a folded path by way of one roller.

FIG. 4 illustrates substantially the same calibration weight arrangement as FIG. 3, with the same reference symbols being used for analogous elements, except that the SMA wire 16 is routed along an alternative path. The SMA wire 16 is likewise connected to the knee-joint linkage 123, but it is trained around only one column-like roller 217. One end of the wire 16 is connected to the knee joint 123 and the other end to the roller 217. In this embodiment, the grooves 27 are connected into a kind of spiraling groove surrounding the roller column. To heat the SMA wire 16, there is again a connection 37 for an electrical heating device.

Figure 5:
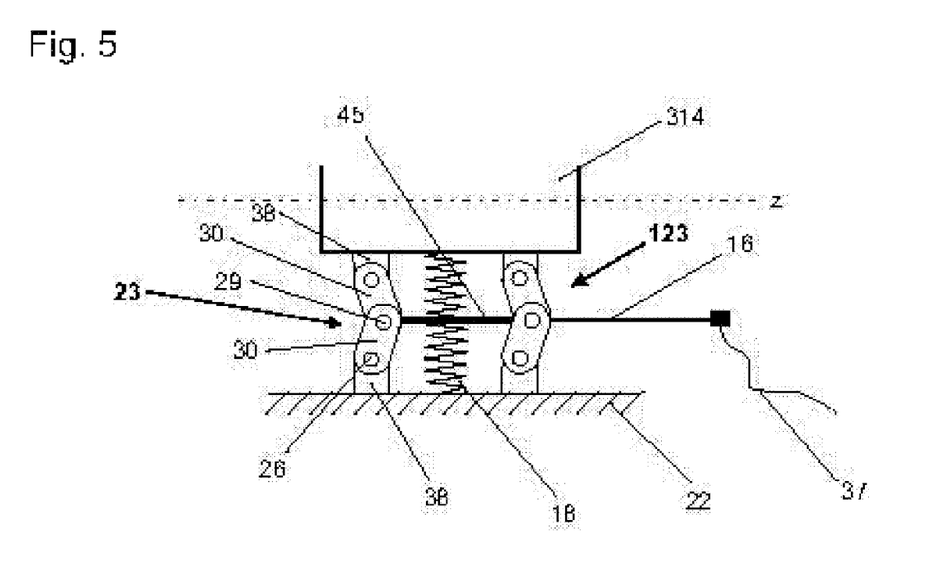
FIG. 5 represents a simplified, schematic frontal view of a transfer mechanism with a lifting element configured as a knee-joint linkage, wherein the axes of rotation of the linkage are oriented perpendicular to the calibration weight axis.

The functional principle of the lifting element in the form of a knee-joint linkage is visualized in FIG. 5 which schematically illustrates a transfer mechanism that includes a calibration weight holder 314, two knee-joint linkages 23,123, a resetting spring 18, and an SMA wire 16 forming part of the actuator. The orientation of the calibration weight is indicated by the calibration weight axis (z). Each of the knee-joint linkages 23, 123 consists of two shaped parts 30 with a joint-like connection, where the joint axes are oriented at a right angle to the calibration weight axis (z). The shaped parts 30 are connected to each other through suitable connecting means 29 such as, e.g., rivets or pins, and to adjoining pieces 38 through further connecting means 26 of the same kind. The adjoining pieces 38, in turn, are fastened, respectively, to the calibration weight holder 314 and to the base plate 22. The connecting means 26, 29 are configured so that they allow a rotation of the shaped parts relative to each other in such a way that the complete knee-joint linkage 23, 123 can fold and subsequently stretch again, analogous to an articulated joint. In order to force the two knee joints 23, 123 to move together, they are connected by a rigid connecting means 45. The connecting means 45 can be configured, e.g., as a rod or a bar. The direction of movement for a displacement from the rest position to the calibrating position is indicated in FIG. 5 by the buckled position of the knee joints 23, 123. The shaped parts 30 of the knee-joint linkage 23, 123 are either of such a length that they extend over the complete depth of the calibration weight holder 314 in the direction perpendicular to the drawing plane, or they are made up of at least four thin shaped parts 30 arranged in pairs that are connected, e.g., by a rod. Arranged between the knee-joints 23, 123 is a resetting spring 18 which, in turn, is connected to the base plate 22 and the calibration weight holder 314. The function of the resetting spring 18 has already been described above. The SMA wire 16 is connected to at least on knee joint 23, 123, so that when the SMA wire 16 undergoes a length contraction due to an increase in temperature, a force is exerted on the mutually connected knee joints 23, 123 whereby both knee joints are caused to fold, which in turn causes a vertical downward displacement of the calibration weight holder 314.

Figure 6:
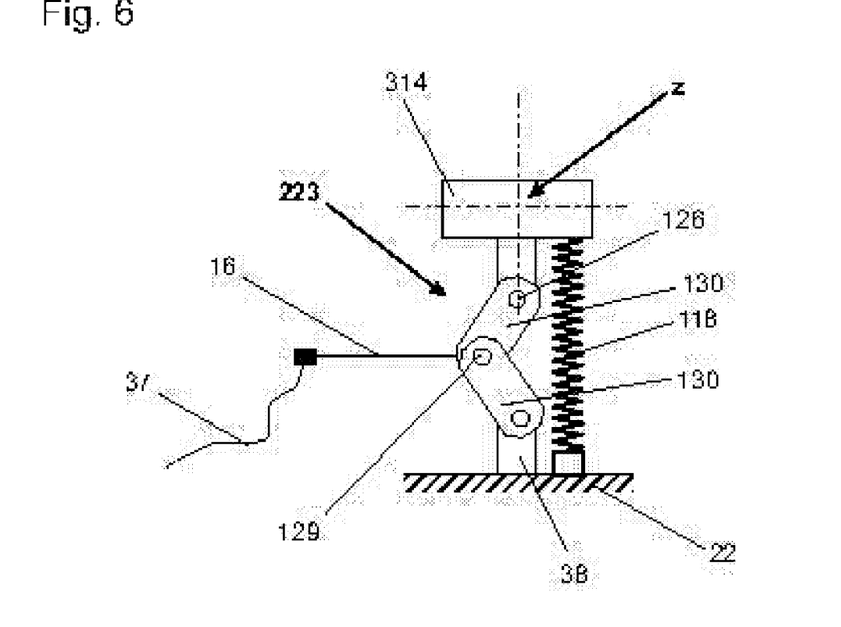
FIG. 6 represents a simplified, schematic side view of a transfer mechanism with a lifting element configured as a knee-joint linkage, wherein the axes of rotation of the linkage are oriented parallel to the calibration weight axis.
Figure 7:
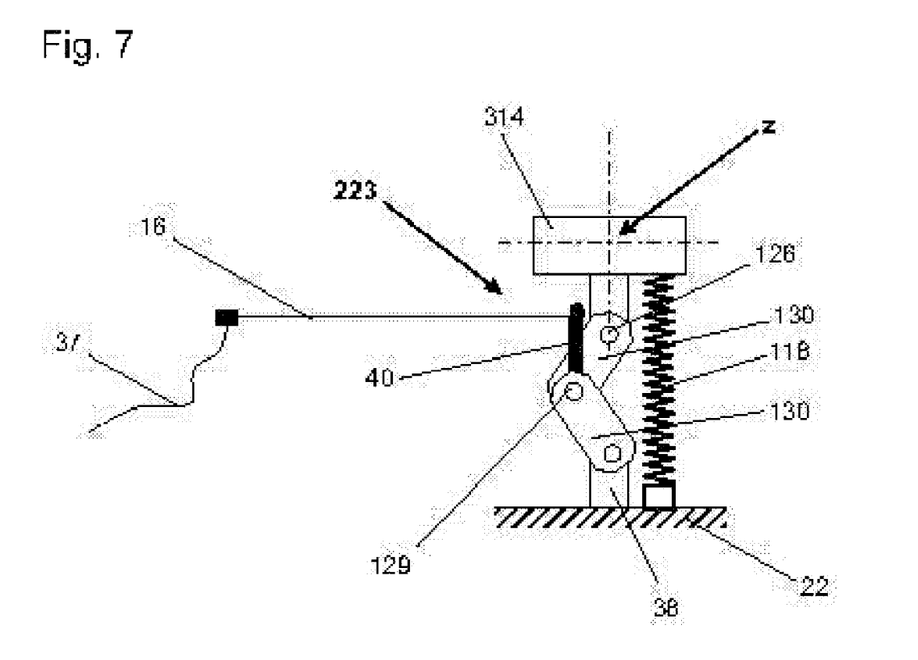
FIG. 7 represents a simplified, schematic side view of a transfer mechanism with a lifting element configured as a knee-joint linkage, wherein the axes of rotation of the linkage are oriented parallel to the calibration weight axis and an actuator is guided from one direction to another by a lever.

A lifting element with at least one knee joint can also be arranged as shown in FIGS. 6 and 7 in a side view. The axes of rotation of the knee joint in both drawing figures are arranged parallel to the calibration weight axis (z). The design of the knee-joint linkage 223 is analogous to FIG. 5, with the shaped parts 130 that form the knee joint having either a one-piece configuration, i.e., taking up almost the complete width of the calibration weight holder 314 in the present example, or with the shaped parts 130 being configured as flat plates that are rotatably joined by suitable connecting means 126,129 such as, e.g., pins or rivets. In the case where the knee-joint linkages 223 are plate-shaped, a pair of the linkages 223 are joined together, for example through connecting means 126, 129 such as rods, with the rods being of a length that is about equal to the width of the calibration weight holder 314. As is also shown in FIG. 5, the SMA wire 16 is fastened between the two shaped parts 130, preferably to the connecting means 129, so that when the SMA wire 16 undergoes a length contraction due to an increase in temperature, a pulling force is exerted on the knee joint linkage 223 whereby the latter is caused to buckle in the joint that is formed by the connecting means 129 and the two shaped parts 130, which in turn causes a vertical downward displacement of the calibration weight holder 314, as illustrated in the drawing. This transfer mechanism likewise includes a resetting element 118 which has the form of a compressive coil spring and is installed between the base plate 22 and the calibration weight holder 314. The function of the resetting element 118 is analogous to the previously described resetting element.

The SMA wire can either be attached directly to the knee-joint linkage as in the embodiments that have been described above, or it can be redirected by a lever that is connected to the knee joint or by a roller. FIG. 7 shows substantially the same transfer mechanism as FIG. 6 but illustrates an alternative attachment for the drive source that is comprised of an SMA wire 16. The SMA wire 16 is fastened to a lever 40 which is rigidly connected to the connecting means 129 located at the mid-position of the knee joint in FIG. 7. When a pulling force is applied to the lever, it will cause the knee joints 223 to buckle, as is illustrated in FIGS. 6 and 7. The lever 40 can either be rigidly connected to the connecting means 129 at the mid-point or to the lower end of one of the two shaped parts 130. Instead of the lever 40, it is also conceivable to redirect the pulling force of the SMA wire 16 with a roller fastened to the knee joint.

Besides the knee joints described above, a calibration weight arrangement can also include other transfer mechanisms and/or lifting elements of the kinds shown in FIGS. 8 to 11.

Figure 8:
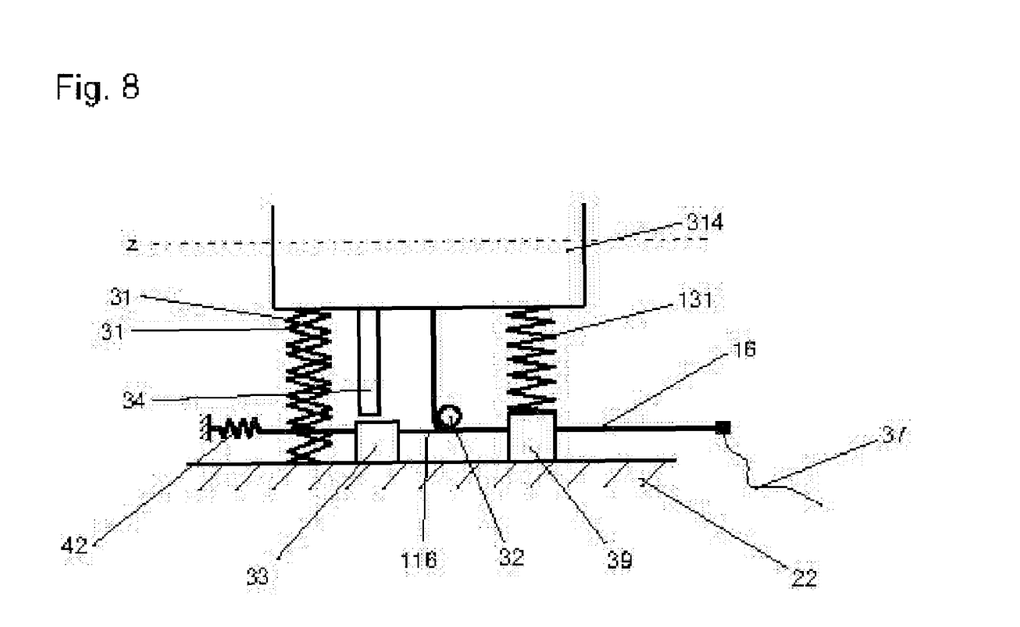
FIG. 8 represents a simplified, schematic frontal view of a transfer mechanism with a lifting element in the form of an arrangement of springs.

FIG. 8 illustrates a calibration weight arrangement in a schematic frontal view with a lifting element configured as a arrangement of springs. The calibration weight holder 314 rests on at least two compressive coil springs. In the illustration there are three coil springs 31, 131 arranged in a triangle. The compressive coil spring 131 is arranged below the middle of one-half of the calibration weight holder 314. In contrast to the springs 31, the spring 131 is not mounted directly on the base plate 22, but is supported on a kind of pedestal 39. This arrangement of the three compressive coil springs 31, 131 reduces the tendency of the calibration weight holder 314 to tip over. The spring force of these springs 31, 131 is sufficiently strong to counteract the weight forces of the calibration weight and the calibration weight holder 314. The orientation of the calibration weight is indicated by the calibration weight axis (z).

The SMA wire 16 in this embodiment is connected directly to the calibration weight holder 314 and runs over a direction-changing roller 32. A second wire 116 which up to the direction-changing roller 32 runs parallel to the first wire is connected to a movable slide 33. In its rest position, the slide 33 is in contact with an overload bolt 34 and thereby locks the position of the calibration weight holder 314. When the wires 16, 116 are heated by way of the indicated connection 37 for an electrical heating device, the SMA wire 16 contracts to a shorter length and pulls the calibration weight holder 14 downwards against the force of the springs 31, 131. The second wire 116 also simultaneously contracts to a shorter length and pulls the slide 33 to the side, so that the overload bolt 34 is freed of its safety constraint. The maximum vertical displacement of the calibration weight holder is thus determined by the distance between the overload bolt 34 and the base plate 22.

The arrangement of springs used here as a lifting element is compressed by the tensile force of the heated wire 16. After the calibration has been completed, the heating device is shut off, the wire 16 cools down and returns again to a more easily formable condition. The springs 31, 131 are decompressed again, move the calibration weight holder 314 to its rest position and exert a force on the SMA wire 16 as it cools down, so that it is stretched again to its original length. Thus, the spring arrangement functions as a lifting element as well as a resetting element. The slide 33 is pulled back under the overload bolt 34 by the force of a further resetting spring 42 which also stretches the wire 116 that is fastened to the slide 33 back to its original length. The resetting spring 42 is fastened in such a way that it has no contact with the compressive coil springs 31.

It is also possible for the compressive coil springs 31, 131 which form the spring arrangement to simultaneously take on the function of the resetting element. This is accomplished by switching the positions of the overload bolt 34 and the direction-changing roller 32 in FIG. 8. The second SMA wire 116 as well as the resetting spring 42 are thus made redundant.

Figure 9:
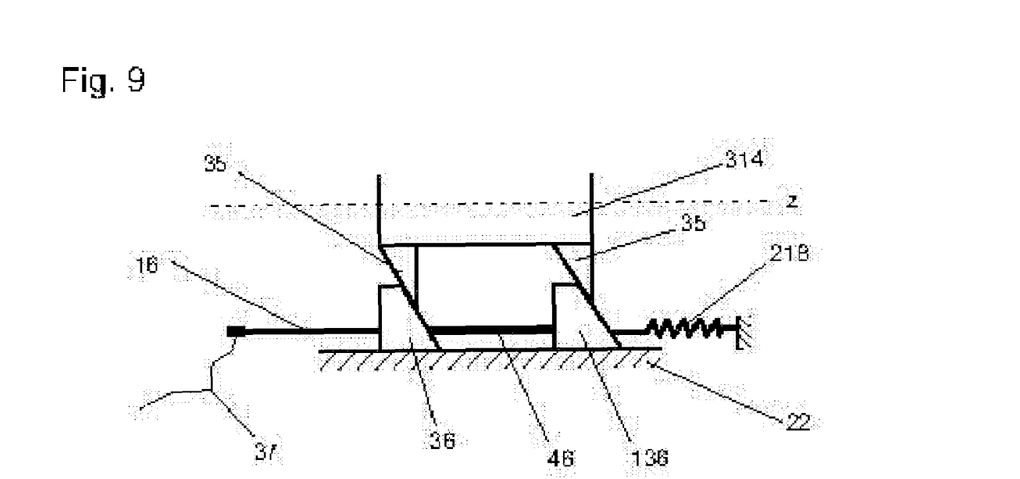
FIG. 9 represents a simplified, schematic frontal view of a transfer mechanism with a lifting element in the form of wedges moving against each other in pairs.

The transfer mechanism disclosed in EP 0 468 159 B1 which includes wedges as lifter elements can likewise be actuated by an SMA wire with an electrical heating device. FIG. 9 shows a frontal view of a transfer mechanism with wedges. The calibration weight holder is moved vertically by wedges 35, 36,136 that move against each other in pairs. The two lower wedges 36,136 are solidly connected to each other by a rigid connecting element 46. If a shape memory alloy in the form of a wire 16 is used as actuator, the wire is attached to one of the two lower wedges 36,136. When the temperature is raised in the range of the phase transition temperature by heating the wire through an electrical heating device connected to one end of the wire (connection 37 only symbolically indicated), the SMA wire 16 will contract to a shorter length. The mechanical energy released by the shortening of the SMA wire 16 causes a horizontal displacement of the wedges 36, 136. In the situation of FIG. 9, the wedges 36, 136 move to the left. At the same time the two upper wedges 35 glide downwards along their contact surfaces with the wedges 36, 136, whereby the calibration weight holder 314 that is connected to the upper wedges 35 is lowered. The length of the SMA wire 16 is selected so that in the presence of a temperature raise, the wire will be capable of moving the lower wedges against the resetting force of the resetting spring 218 that is fastened to the wedge 136. The resetting spring 218 again serves the function to return the wedges 35, 36, 136 to their rest positions and to stretch the SMA wire 16 during its cooling-down phase back to its original length.

Figure 10:
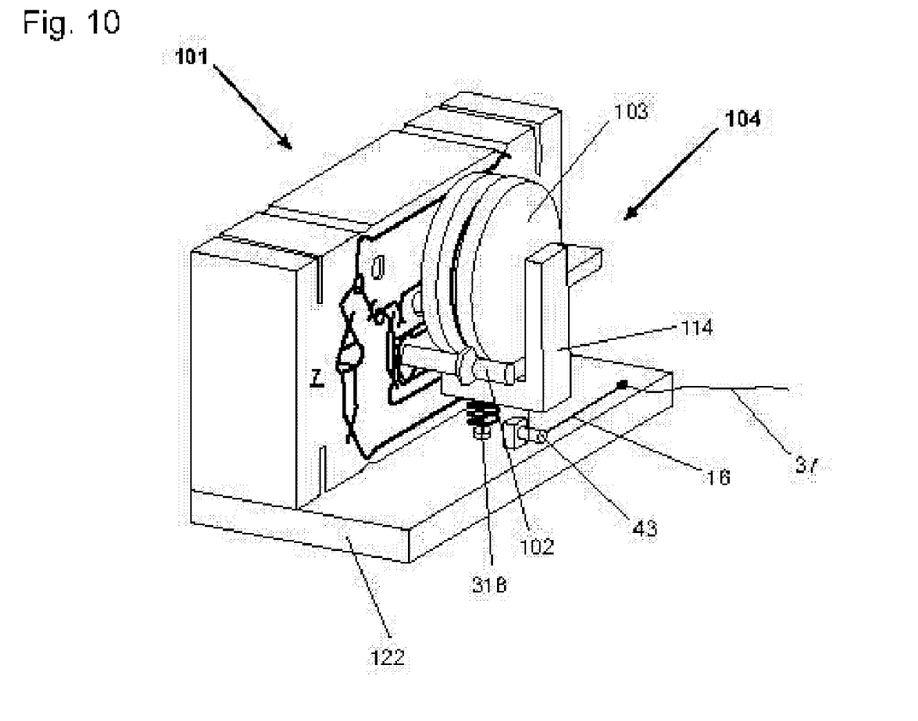
FIG. 10 represents a simplified, perspective view of a force-transmitting device with a laterally placed calibration weight arrangement which puts a calibration weight into force-transmitting contact with the force-transmitting device by a vertical lowering of the calibration weight holder.

A further embodiment for a combination of a calibration weight arrangement 104 and a force-transmitting device 101 is disclosed in the Emery '854 patent cited above. This combination is illustrated in a perspective view in FIGS. 10 and 11 together with an actuator that comprises an SMA wire. In FIG. 10 there are two calibration weights 103 (only one of which is within view) arranged laterally on the monolithic force-transmitting device 101. When the calibration weight 103 is in its rest position, it rests entirely on a calibration weight holder 114 that is fastened to the stationary part of the force-transmitting device 101, and there is no engagement of the calibration weight with the lever mechanism of the force-transmitting device 101. To perform a calibration, the calibration weight holder 114 is lowered so that the calibration weight 103 is set down on two calibration weight receivers 102 (only one of which is within view) which are connected to the lever mechanism of the force-transmitting device 101, whereby the calibration weight is brought into force-transmitting contact with the lever mechanism. The movement of the calibration weight holder 114 is initiated by electrically heating the SMA wire 16 which applies a pulling force to the bottom of the calibration weight holder 114. The connection 37 for the electrical heating device is only symbolically indicated in this drawing. The wire 16 is given a turn in direction by a roller 43 that is fastened to the base plate 122, with further windings and/or turns in direction depending on the available space. After a successful calibration, the current supply to the wire 16 is interrupted and the calibration weight holder 114 is returned to its rest position by the force of a resetting spring 318. In this operation, the calibration weight holder 114 contacts the calibration weight from below and lifts it, thereby releasing the force-transmitting contact between the calibration weight 103 and the calibration weight receiver 102. In addition, the resetting spring 318 causes the wire 16 to be stretched back to its original length as it cools down after the calibration.

Figure 11:
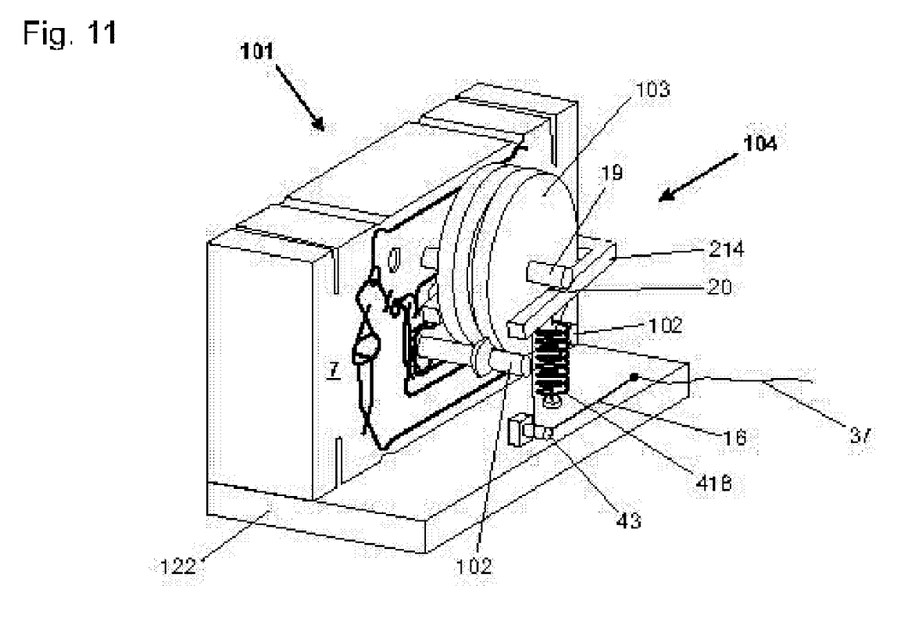
FIG. 11 represents a simplified, perspective view of a force-transmitting device with a lateral calibration weight arrangement which puts a calibration weight into force-transmitting contact with the force-transmitting device by a tilting movement of the calibration weight holder.

In FIG. 11, there are likewise two calibration weights 103 arranged laterally at the force-transmitting device 101. The second calibration weight is on the opposite side of the force-transmitting device 101 and is hidden from view in this perspective. The calibration weight arrangement 204 in FIG. 11 consists of a calibration weight holder 214 in the shape of a fork, with the closed end of the fork being tiltably pivoted on the stationary part of the force-transmitting device 101. At the free end of the fork tine that faces away from the force-transmitting device 101, one end of an SMA wire 16 is attached to the calibration weight holder 214. The SMA wire 16 is given a turn in direction by a roller 43 that is mounted on the base plate 122 and, depending on the available space, the SMA wire is further wound up and/or given several changes in direction. The SMA wire 16 is connected to an electrical heating device which is only symbolically indicated here as a connection 37 whereby the wire can be heated, e.g., by applying an electric current. Heating to a temperature above the phase transition temperature causes the SMA wire 16 to contract in length and to exert a pulling force on the calibration weight holder 214, so that the latter tilts downward in response to the force. As a result, the calibration weight 103, which in its rest position is held by a positioning pin 19 in a groove 20 of the calibration weight holder 214, loses contact with the calibration weight holder 214 as it is set down on the two calibration weight receivers 102 which are in engagement with the lever mechanism of the force-transmitting device 101. With the lever mechanism and the calibration weight 103 having thus been brought into force-transmitting contact, a calibration can be carried out. After the calibration has been completed, the current supply to the SMA wire 16 is interrupted. A resetting spring 418 which is arranged next to the SMA wire 16 between the calibration weight holder 214 and the base plate 122 and is likewise acting against the calibration weight holder 214 causes the calibration weight holder 214 to return to its rest position and to separate the force-transmitting contact between the calibration weight receivers 102 and the calibration weight 103. The resetting spring 418 further has the function to stretch the wire back to its original length as it cools down after the current has been switched off.

All of the actuators shown in the foregoing examples, which have the form of wires and consist at least in part of a shape memory alloy, are preferably heated by connecting them to an electrical heating device. As the temperature of the wire rises above the phase transition temperature of the shape memory alloy the wire contracts in length. This phenomenon is used to check the functioning of the calibration weight arrangement by measuring the electrical resistance of the wire through conventional methods. The electrical resistance of a wire depends on its length. The measured resistance value is indicative of the length of the wire and thus also provides an indication whether the calibration weight arrangement is in its rest position or in its calibrating position, since a displacement of the transfer mechanism and thus of the calibration weight is coupled to a change in length of the SMA wire.

As shown for example in FIG. 3, the SMA wire can be trained around a plurality of rollers located at the narrow sides of the calibration weight arrangement. Nevertheless, the calibration weight arrangement is not limited to this concept of routing the SMA wire. It is also conceivable to change the direction of the wire with at least one roller or at least one lever located along the width of the calibration arrangement or oriented at any angle to the base plate of the calibration weigh arrangement. As the SMA wire is very flexible, it is possible to arrange it as dictated by the available space in the force-measuring cell of a balance, to wind it into a coil and/or to route it in segments with different directions.

As can be seen in the examples, the SMA wire is given an change in direction by way of at least one roller. To optimize the force transmission, it is possible either to redirect the wire several times so that the wire forms, e.g., a kind of loop where both ends of the wire act on the same component, or to use more than one wire, preferably arranging the wires parallel to each other. Besides rollers one could, of course, also use other elements such as, e.g., levers as direction-changing means.

The actuator consists of a shape memory alloy with the capability to respond to a temperature change by transforming itself between a martensitic phase and an austenitic phase. A multitude of shape memory alloys are known. The actuator in the preferred embodiments is made preferably of a shape memory alloy. Among others, this includes alloys of a group that consists of $NiTi_2$, CuZn, CuZnAl, CuZnGa, CuZnSn, CuZnSi, CuAlNi, CuAuZn, CuSn, AuCd, AgCd, NiAl und FePt. With preference a $NiTi_2$ alloy is used which ideally contains about 50% nickel and has a phase transition temperature of at least 90° C.

The length of the SMA wire is determined by the composition of the shape memory alloy, the force to be generated and the required lifting height. An SMA wire of a nickel-titanium alloy with about 50% nickel and a diameter of about 150 μm contracts by about 4% of its length when the temperature rises above the phase transition temperature.

The shape memory alloy being used is distinguished by a long operating life. A wire made from the alloy can be heated and cooled about 10,000 times, preferably 100,000 times, without suffering from material fatigue.

The actuator in the exemplary embodiments is configured preferably as a wire, because a wire exhibits the best resistance and heating properties. Also feasible is a design of the actuator as a flat ribbon of round, oval or rectangular diameter.

A further possibility is offered by the property that the material can change its shape. Thus it is possible, for example, to use a shape memory alloy in the form of a compressive coil spring which, with appropriate kinematic constraints, can simultaneously perform the function of the resetting element and the lifting element.

To perform a calibration, the calibration weight is brought into force-transmitting contact with a calibration weight receiver that is connected to the lever mechanism of the force-transmitting device. In the examples discussed herein, this movement of the calibration weight is effected by a vertical displacement or a tilting movement of the calibration weight. By making use of the flexibility of the wire, it is possible to realize further transfer mechanisms. It is thus conceivable that the calibration weight is pulled upwards to remove it from contact with the calibration weight receiver, or that the drive source moves a rail sideways and thereby releases an arrestment of the calibration weight.

The preferred embodiments presented hereinabove demonstrate a combination of a calibration weight arrangement with a monolithic force-transmitting device. There are other known force-transmitting devices that could be combined with a calibration weight arrangement as shown in FIG. 1. Of course, any force-transmitting devices that can be combined with a calibration weight arrangement as shown in FIG. 1 could also be combined with an actuator comprising a shape memory alloy according to the embodiments described above.

Calibration arrangements of the kind presented here can be used in balances of high-resolution as well as balances of a lower level of resolution.

What is claimed is:

1. A calibration weight arrangement for an electronic balance which has a force-transmitting device, the calibration weight arrangement comprising:
    at least one calibration weight, adapted to be coupled to the force-transmitting device;
    a transfer mechanism; and
    a drive source to guidedly move the at least one calibration weight, the drive source having an actuator comprising a shape memory alloy that cooperates with the transfer mechanism, such that a structural change of the shape memory alloy occurring as a result of a temperature change causes the actuator to move the calibration weight.

2. The calibration weight arrangement of claim 1, wherein the drive source comprises an electrical heating device that cooperates with the actuator.

3. The calibration weight arrangement of claim 2, wherein the transfer mechanism comprises:
   means for resetting the calibration weight; and
   means for lifting the calibration weight.

4. The calibration weight arrangement of claim 3, wherein the resetting means has a resetting force of sufficient magnitude both to move the transfer mechanism and the calibration weight to their respective rest positions and to return the shape memory alloy to an original shape or length during a cool-down phase thereof.

5. The calibration weight arrangement of claim 3, wherein the resetting means comprises at least one spring.

6. The calibration weight arrangement of claim 3, wherein the lifting means is configured either as wedges that move against each other in pairs or in the form of at least one knee-joint linkage.

7. The calibration weight arrangement of claim 3, wherein:
   the lifting means comprises at least two compressive coil springs.

8. The calibration weight arrangement of claim 7, wherein:
   each of the compressive coil springs also serve as the resetting means.

9. The calibration weight arrangement of claim 3, wherein the transfer mechanism comprises an element serving both as the resetting means and the lifting means.

10. The calibration weight arrangement of claim 9, wherein the resetting and lifting element has a resetting force of sufficient magnitude both to move the transfer mechanism and the calibration weight to their respective rest positions and to return the shape memory alloy to an original shape or length during a cool-down phase thereof.

11. The calibration weight arrangement of claim 10, wherein the resetting and lifting element comprises at least one spring.

12. The calibration weight arrangement of claim 11, wherein the actuator is adapted to perform a function check of the transfer mechanism.

13. The calibration weight arrangement of claim 12, further comprising at least one means for direction-changing, adapted to change the direction of the actuator force.

14. The calibration weight arrangement of claim 13, wherein the direction-changing means are rollers, at least one of which comprises a smooth, gliding material.

15. The calibration weight arrangement of claim 14, wherein the resetting and lifting element is configured either as wedges that move against each other in pairs or in the form of at least one knee-joint linkage.

16. The calibration weight arrangement of claim 14, wherein:
   the resetting and lifting element comprises at least two compressive coil springs.

17. The calibration weight arrangement of claim 1, wherein the shape memory alloy is selected from the group consisting of: NiTi2, CuZn, CuZnAl, CuZnGa, CuZnSn, CuZnSi, CuAlNi, CuAuZn, CuSn, AuCd, AgCd, NiAl and FePt.

18. The calibration weight arrangement of claim 1, wherein the shape memory alloy comprises a nickel-titanium alloy with a nickel content of at least 40% and with a phase transition temperature of at least 80° C.

19. The calibration weight arrangement of claim 1, wherein the shape memory alloy in the actuator is configured in wire form.

20. The calibration weight arrangement of claim 1, wherein the transfer mechanism comprises:
   means for resetting the calibration weight; and
   means for lifting the calibration weight.

21. The calibration weight arrangement of claim 20, wherein the transfer mechanism comprises an element serving both as the resetting means and the lifting means.

22. The calibration weight arrangement of claim 1, wherein the actuator is adapted to perform a function check of the transfer mechanism.

23. The calibration weight arrangement of claim 1, further comprising at least one means for direction-changing, adapted to change the direction of the actuator force.

* * * * *

UNITED STATES PATENT AND TRADEMARK OFFICE
CERTIFICATE OF CORRECTION

| | | |
|---|---|---|
| PATENT NO. | : 7,395,689 B2 | Page 1 of 1 |
| APPLICATION NO. | : 11/164795 | |
| DATED | : July 8, 2008 | |
| INVENTOR(S) | : Genoud et al. | |

It is certified that error appears in the above-identified patent and that said Letters Patent is hereby corrected as shown below:

In column 1, lines 6-20, please delete "To perform a calibration, the calibration weight is lowered transfer mechanism onto the two calibration weight receivers 2, whereby the calibration weight is put into force-transmitting contact with the lever mechanism, as shown in FIG. 2. In the illustrated condition, the calibration weight 3 rests completely on the calibration weight receiver 2 and is no longer in contact with the calibration weight holder 14. The transfer mechanism is hidden from view here by the calibration weight holder 14. The calibration weight arrangement comprises a lifting element and a drive source. In many cases, an eccentric is used as a lifting element, powered by a commercially available servomotor (not shown in the drawing). In general, the drive source is arranged laterally of the calibration weight arrangement, which in relation to the drawings is either in front of the drawing plane or behind it." and insert -- The invention relates to a calibration weight arrangement for an electronic balance, and it relates in particular to a drive source for a calibration weight arrangement. --.

In column 7, line 35, please delete "transfer mechanism" and insert -- calibration weight arrangement --.

Signed and Sealed this

Twenty-sixth Day of August, 2008

JON W. DUDAS
*Director of the United States Patent and Trademark Office*